US010080131B2

(12) United States Patent
Gao et al.

(10) Patent No.: US 10,080,131 B2
(45) **Date of Patent: *Sep. 18, 2018**

(54) PROCESSING OF ACCESS POINT CROWDSOURCING DATA

(71) Applicant: QUALCOMM Incorporated, San Diego, CA (US)

(72) Inventors: Weihua Gao, San Jose, CA (US); Gengsheng Zhang, Cupertino, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 14/796,929

(22) Filed: Jul. 10, 2015

(65) Prior Publication Data

US 2015/0319604 A1 Nov. 5, 2015

Related U.S. Application Data

(63) Continuation of application No. 13/706,066, filed on Dec. 5, 2012, now Pat. No. 9,084,122, which is a (Continued)

(51) Int. Cl.
*H04L 12/66* (2006.01)
*H04W 8/08* (2009.01)
(Continued)

(52) U.S. Cl.
CPC ................ *H04W 8/08* (2013.01); *G01S 5/02* (2013.01); *G01S 5/0242* (2013.01);
(Continued)

(58) Field of Classification Search
CPC ... H04W 76/023; H04W 48/16; H04W 8/005; H04W 24/02; H04W 88/06
(Continued)

(56) References Cited

U.S. PATENT DOCUMENTS 7,916,708 B2 * 3/2011 Hart ...................... H04W 16/32 370/338
8,467,784 B2 6/2013 Balasubramanian et al.
(Continued)

FOREIGN PATENT DOCUMENTS

CN 101208905 A 8/2008
CN 101873672 A 10/2010
(Continued)

OTHER PUBLICATIONS

International Search Report and Written Opinion—PCT/US2013/049934—ISA/EPO—Oct. 16, 2013.

*Primary Examiner* — Andrew Chriss
*Assistant Examiner* — Atique Ahmed
(74) *Attorney, Agent, or Firm* — Silicon Valley Patent Group LLP

(57) ABSTRACT

Method and apparatus for processing access point (AP) crowdsourcing data are disclosed. In one embodiment, the method comprises receiving WiFi scan lists and their corresponding location descriptions, where the WiFi scan lists and their corresponding location descriptions include information observed about at least one access point device, consolidating the WiFi scan lists and their corresponding location descriptions based at least in part on a set of selection criteria to generate a WiFi AP record, where the set of selection criteria comprises a maximum number of scan lists to be uploaded in a predetermined period of time and the maximum number of scan lists to be uploaded in a single upload, and uploading the WiFi AP record to a crowdsourcing server.

30 Claims, 10 Drawing Sheets

Related U.S. Application Data continuation-in-part of application No. 13/612,582, filed on Sep. 12, 2012, now Pat. No. 9,167,551.

(60) Provisional application No. 61/677,986, filed on Jul. 31, 2012.

(51) Int. Cl.

| | |
|---|---|
| ***H04W 4/02*** | (2018.01) |
| ***H04W 28/02*** | (2009.01) |
| ***H04W 24/00*** | (2009.01) |
| ***H04W 64/00*** | (2009.01) |
| ***G01S 5/02*** | (2010.01) |
| ***H04W 48/16*** | (2009.01) |
| *H04W 88/08* | (2009.01) |
| *H04W 8/18* | (2009.01) |
| *H04W 84/12* | (2009.01) |

(52) U.S. Cl.

CPC ........... *H04W 4/025* (2013.01); *H04W 24/00* (2013.01); *H04W 28/0226* (2013.01); *H04W 48/16* (2013.01); *H04W 64/003* (2013.01); *H04W 8/18* (2013.01); *H04W 84/12* (2013.01); *H04W 88/08* (2013.01)

(58) Field of Classification Search

USPC .......................................................... 370/328

See application file for complete search history.

(56) References Cited

U.S. PATENT DOCUMENTS

| | | | | |
|---|---|---|---|---|
| 8,527,602 | B1 | 9/2013 | Rasmussen et al. | |
| 2007/0030824 | A1* | 2/2007 | Ribaudo ............... | G01S 5/0018 370/328 |
| 2007/0167174 | A1 | 7/2007 | Halcrow et al. | |
| 2007/0275701 | A1 | 11/2007 | Jonker | |
| 2008/0176583 | A1* | 7/2008 | Brachet ................. | G01S 5/0236 455/456.3 |
| 2008/0186882 | A1 | 8/2008 | Scherzer et al. | |
| 2010/0097982 | A1* | 4/2010 | Eichenberger ........ | H04W 36/08 370/328 |
| 2010/0110921 | A1 | 5/2010 | Famolari et al. | |
| 2010/0111053 | A1 | 5/2010 | Avital et al. | |
| 2010/0260068 | A1 | 10/2010 | Bhatt et al. | |
| 2011/0029670 | A1 | 2/2011 | Klein et al. | |
| 2011/0051658 | A1* | 3/2011 | Jin .......................... | G01S 19/48 370/328 |
| 2011/0059752 | A1 | 3/2011 | Garin et al. | |
| 2011/0131172 | A1 | 6/2011 | Herzog et al. | |
| 2011/0165892 | A1 | 7/2011 | Ristich et al. | |
| 2011/0317579 | A1* | 9/2011 | Jones ...................... | H04W 4/02 370/252 |
| 2011/0286437 | A1* | 11/2011 | Austin .................... | H04W 4/02 370/338 |
| 2011/0306365 | A1 | 12/2011 | Wirola et al. | |
| 2011/0320588 | A1 | 12/2011 | Raleigh | |
| 2012/0028654 | A1 | 2/2012 | Gupta et al. | |
| 2012/0194382 | A1 | 8/2012 | Anderson et al. | |
| 2013/0023282 | A1* | 1/2013 | Lin ....................... | G01S 5/0252 455/456.1 |
| 2013/0116965 | A1 | 5/2013 | Lin et al. | |
| 2013/0188508 | A1 | 7/2013 | Cho et al. | |
| 2013/0303184 | A1 | 11/2013 | Yang et al. | |
| 2014/0036701 | A1 | 2/2014 | Gao et al. | |
| 2014/0036768 | A1 | 2/2014 | Gao et al. | |

FOREIGN PATENT DOCUMENTS

| | | | |
|---|---|---|---|
| CN | 101932054 | A | 12/2010 |
| CN | 102238694 | A | 11/2011 |
| WO | 2006110181 | A2 | 10/2006 |
| WO | WO-2008008987 | A2 | 1/2008 |
| WO | 2009155036 | A2 | 12/2009 |
| WO | WO-2011127005 | A1 | 10/2011 |
| WO | 2012005469 | A2 | 1/2012 |

* cited by examiner

PROCESSING OF ACCESS POINT CROWDSOURCING DATA

CROSS REFERENCE TO RELATED APPLICATIONS

This application is a continuation of United States non-provisional application bearing Ser. No. 13/706,066, "Processing of Access Point Crowdsourcing Data", filed Dec. 5, 2012, which is a continuation-in-part of, and claims priority under 35 U.S.C. § 120 to United States non-provisional application bearing Ser. No. 13/612,582, "Mobile Access Point Detection", filed Sep. 12, 2012, which claims the benefit of U.S. provisional application bearing Ser. No. 61/677,986, "Processing of Access Point Crowdsourcing Data" filed Jul. 31, 2012. The aforementioned United States applications are hereby incorporated by reference in their entirety.

FIELD

The present disclosure relates to the field of wireless communications. In particular, the present disclosure relates to methods and devices for processing of access point crowdsourcing data are disclosed.

BACKGROUND

Mobile access points (APs) are WiFi APs that are constantly on the move, which include MiFi, 802.11G wireless pocket router/AP, Apple AirPort Express Base Station and other travel routers, sometimes, the smart-phones and laptops can also serve as travel access points. If these APs are stored in a WiFi AP database, given the mobility nature of these APs, they can greatly affect the positioning performance of WiFi mobile users, since these APs may be used as anchor or reference point to calculate the mobile client's position.

One way to update the WiFi AP database is through crowdsourcing, where AP data sets may be collected from a plurality of mobile devices and then uploaded to a server. However, some conventional crowdsourcing methods may not control the crowdsourcing data that may be sent from the mobile clients to the server. As a result, these conventional crowdsourcing methods may create excessive data for upload to the server and may require extra processing and storage at the server. In addition, these conventional crowdsourcing methods may use valuable bandwidth and consume battery power, which in turn may adversely impact user experience of the mobile devices.

Therefore, there is a need for methods and devices for processing of access point crowdsourcing data that can address the above issues.

SUMMARY

The present disclosure relates to methods and devices for processing of access point crowdsourcing data. In one embodiment, a method for processing of access point crowdsourcing data comprises receiving WiFi scan lists and their corresponding location descriptions, consolidating the WiFi scan lists and their corresponding location descriptions based at least in part on a set of selection criteria to generate a WiFi AP record, and uploading the WiFi AP record to a crowdsourcing server.

The method of receiving WiFi scan lists and their corresponding location descriptions comprises partitioning a geographical area into a series of tiles, wherein each tile covers a portion of the geographical area, observing at least one access point device within a tile, and compiling information observed about the at least one access point device to form the WiFi scan lists and their corresponding location descriptions. Note that the information observed about the at least one access point device comprises observation time, latitude, longitude, altitude, horizontal uncertainty, and vertical uncertainty of the at least one access point being observed. The information observed about the at least one access point device further comprises MAC (media access control) address, SSID (service set identifier), RSSI (received signal strength indication), RTT (round-trip time), radio specification and frequency band. The location descriptions include at least one of GNSS (global navigation satellite system) position measurement information and non-GNSS position measurement information.

The method of receiving WiFi scan lists and their corresponding location descriptions further comprises collecting WiFi scan lists and their corresponding location descriptions according to at least one triggering event, and collecting WiFi scan lists and their corresponding location descriptions according to at least one triggering time. The at least one triggering event comprises a successful GNSS fix by a client, a WiFi scan by the client, and a failed GNSS fix by the client.

The method consolidating the WiFi scan lists and their corresponding location descriptions comprises quantizing data received in accordance with time segment of the WiFi scan lists and their corresponding location descriptions. The method of consolidating the WiFi scan lists and their corresponding location descriptions further comprises replacing an older scan list with a newer scan list in response to the WiFi scan lists within a tile exceeds a predetermined number.

The set of selection criteria comprises a maximum number of scan lists to be uploaded in a predetermined period of time, and a maximum number of scan lists to be uploaded in a single upload. The set of selection criteria further comprises ratio of MNoO to remaining unprocessed observations, similarity between scan lists, and comparison of HEPE values between similar scan lists.

The method of uploading the WiFi AP record to a crowdsourcing server comprises comparing the WiFi AP record with previously uploaded WiFi AP records stored in a local cache, and removing duplicates in the WiFi AP record.

In another embodiment, a computer program product comprises a non-transitory medium storing computer programs for execution by one or more computer systems. The computer program product includes code for receiving WiFi scan lists and their corresponding location descriptions, code for consolidating the WiFi scan lists and their corresponding location descriptions based at least in part on a set of selection criteria to generate a WiFi AP record, and code for uploading the WiFi AP record to a crowdsourcing server.

In yet another embodiment, an apparatus comprises one or more processors, and an access point crowdsourcing data processing module configured to work with the one or more processors. The access point crowdsourcing data processing module includes a receiver configured to receive WiFi scan lists and their corresponding location descriptions, a data consolidation module configured to consolidate the WiFi scan lists and their corresponding location descriptions based at least in part on a set of selection criteria to generate a WiFi AP record, and an upload manager configured to upload the WiFi AP record to a crowdsourcing server, and a memory configured to store the WiFi AP record.

In yet another embodiment, an system comprises means for receiving WiFi scan lists and their corresponding location descriptions, means for consolidating the WiFi scan lists and their corresponding location descriptions based at least in part on a set of selection criteria to generate a WiFi AP record, and means for uploading the WiFi AP record to a crowdsourcing server.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1A:
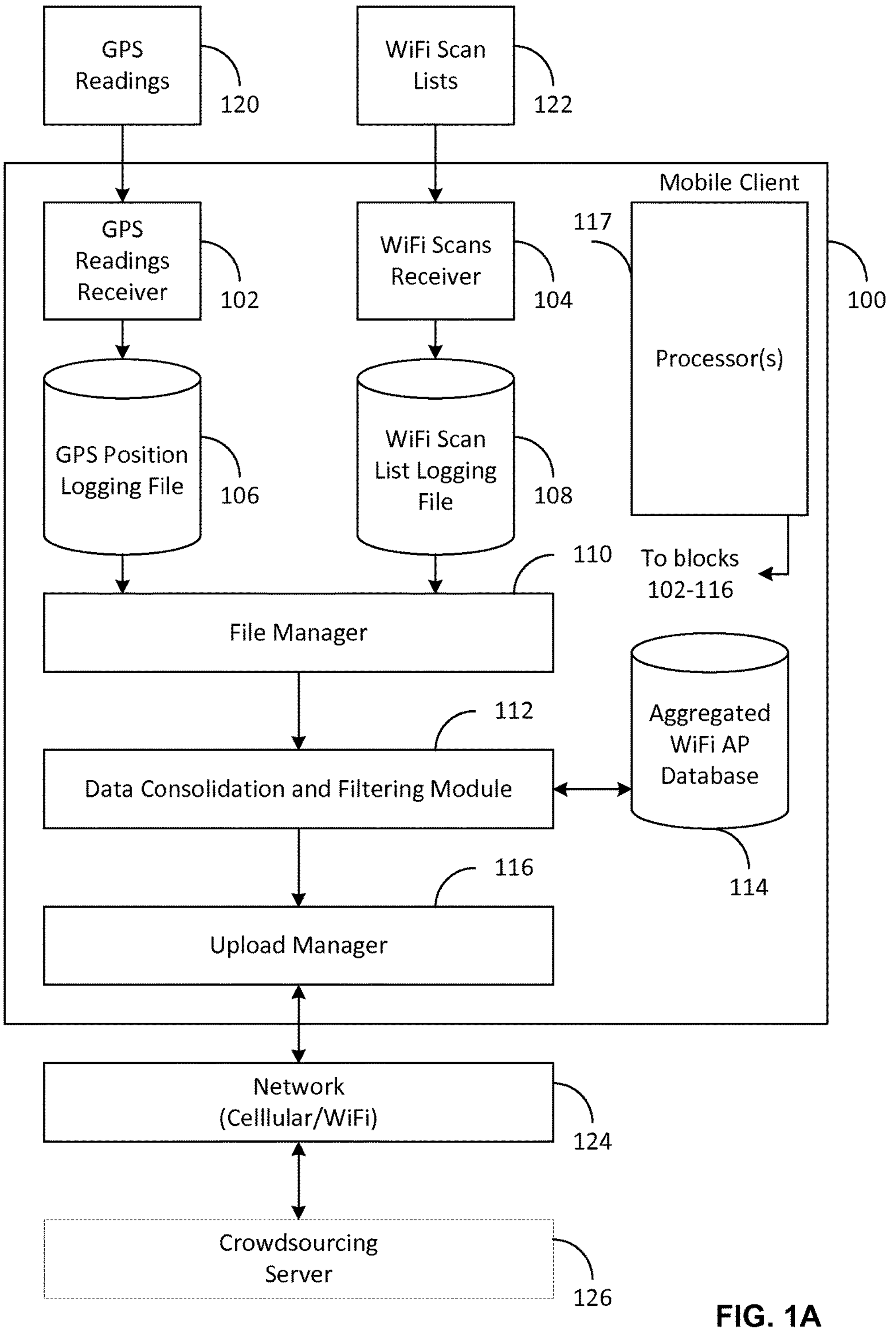
FIG. 1A-1B illustrates an exemplary crowdsourcing system according to some aspects of the present disclosure.
Figure 1B:
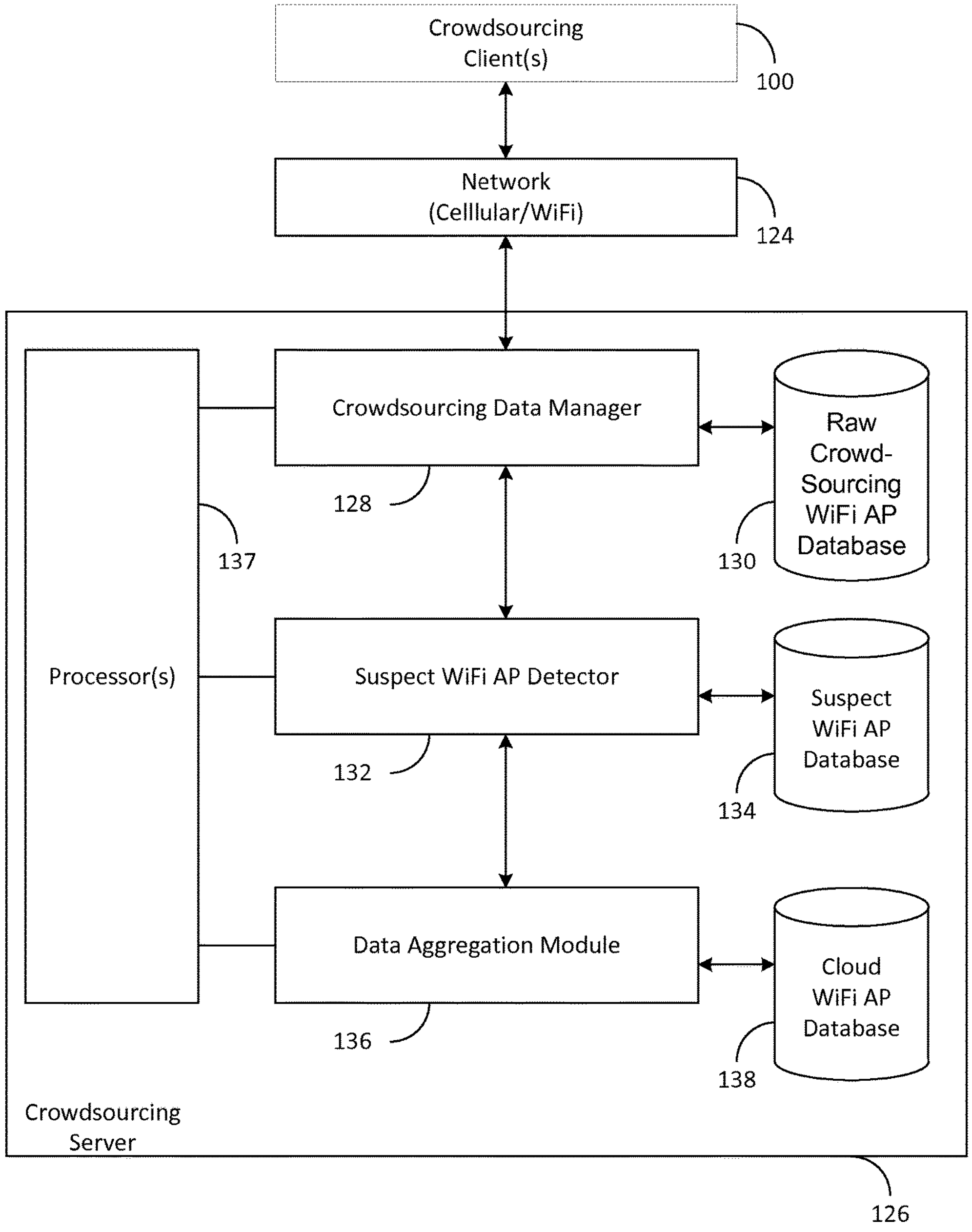

FIG. 1A-1B illustrates an exemplary crowdsourcing system according to some aspects of the present disclosure. The crowdsourcing system includes a crowdsourcing client and a crowdsourcing server. As shown in FIG. 1A, the mobile client 100 includes GPS readings receiver 102, WiFi scans receiver 104, GPS position logging file 106, WiFi scan list logging file 108, file manager 110, data consolidation and filtering module 112, aggregated WiFi AP database 114, upload manager 116, and one or more processors 117. The GPS readings receiver 102 receives GPS readings 120 and uses this information to update the GPS position logging file 106. Similarly, the WiFi scans receiver 104 receives WiFi scan lists 122 and uses this information to update the WiFi scan list logging file 108. The file manager 110 matches WiFi scan observations in the WiFi scan list logging file 108 to their corresponding GPS positions in the GPS position logging file 106. The data consolidation and filtering module 112 takes input from the file manager 110 to generate a local aggregated WiFi AP file, which is stored in the aggregated WiFi AP database 114. The upload manager 116 is configured to upload the consolidated and filtered WiFi AP data and sends the information to a crowdsourcing server 126 via a communication network 124. The one or more processors 117 can be configured to work with GPS reading receiver 102, WiFi scans receiver 104, file manager 110, data consolidation and filtering module 112, and upload manager 116 to perform the functions described by each of the blocks.

In the exemplary block diagram shown in FIG. 1B, the crowdsourcing server 126 includes crowdsourcing data manager 128, suspect WiFi AP detector 132, data aggregation module 136, and one or more processors 137. The crowdsourcing data manager 128 communicates with one or more crowdsourcing clients 100 via network 124, which may be a cellular network or a WiFi network. The crowdsourcing data manager 128 gathers crowdsourcing WiFi AP data from the crowdsourcing clients 100 and stores the data in the raw crowdsourcing WiFi AP database 130. The suspect WiFi AP detector 132 receives crowdsourcing WiFi AP data from the crowdsourcing data manager 128 and detects certain access points that may be questionable regarding the mobility and existence of such access points. The questionable access points are stored in the suspect WiFi AP database 134. The data aggregation module 136 receives crowdsourcing WiFi AP data from the suspect WiFi AP detector 132, and consolidates such data in the cloud WiFi AP database 138. The one or more processors 137 can be configured to work with crowdsourcing data manager 128, suspect WiFi detector 132, and data aggregation module 136 to perform the functions described by each of the blocks.

According to embodiments of the present disclosure, the mobile client can be configured to organize measurements of the WiFi APs it has observed. In addition, the mobile client can be configured to minimize repetitive and redundant measurements, consolidate the measurements, and upload the access point crowdsourcing data to a server. The consolidation process at the client may involve quantizing and processing of collected data to reduce the amount of data to be uploaded.

In one approach, the mobile client can be configured to collect of time-stamped sets of AP data, and process collected data to select an appropriate sub-set for upload to the server. Various implementations may be employed to trigger a data collection, including but not limited to: triggers to initiate an opportunistic-based data collection, triggers to initiate a timer-based data collection, and triggers to initiate a failure-based data collection. For example, an opportunistic-based data collection may be triggered by a successful GNSS fix by a mobile client, a WiFi scan by the mobile client, and/or a failed GNSS fix by the mobile client.

In another approach, a timer-based data collection may be triggered by an elapsed time since the last WiFi scan list collection. This can be done to insure that some data is collected by the mobile client. In some implementations, the GNSS fix may be acquired before the WiFi scan for timer-based observations. In yet another approach, a failure-based data collection may be triggered based on failure of WiFi positioning due to low hit ratio on existing tiles.

Note that the server (also referred to as crowdsourcing server 126) can be configured to collect the WiFi AP crowdsourcing data from its participating mobile clients (also referred to as crowdsourcing clients 100), and use the collected data to create and maintain a WiFi AP database for various applications. For example, the server can be configured to organize the uploaded access point crowdsourcing data from participating mobile clients. In some applications, the server may be configured to make position estimates of the APs that have been measured. In some implementations, the parameters that are estimated for each AP may include, but not limited to: 1) AP position latitude in degrees; 2) AP position longitude in degrees; 3) AP's MAR (coverage radius) in meters; and 4) AP's horizontal position uncertainty in meters.

Note that when WiFi crowdsourcing data collection is triggered by a WLAN scan event, the mobile client may attempt to obtain a position fix for a WiFi scan list (unless the scan list corresponds to a previous failed GNSS fix). If a position fix is attempted, the time for acquiring a fix may be used to ensure that the fix corresponds to the location for the scan. When WiFi crowdsourcing data collection is triggered by a GNSS fix, the mobile client may attempt a WLAN scan. Note that there may be cases, for example rural environments, for which no WiFi scan list may be obtained.

In some implementations, when collecting crowdsourcing data, the mobile client may keep both the GNSS and WiFi functions turned on. The WiFi scanner and the position fix can be synchronized by GPS time stamp. The GPS position logging file (106) that includes the GPS position fix, and WiFi scan list logging file (108) that includes WiFi scans, may be stored separately, and they may be organized by a file manager (110) of the mobile client. In one exemplary approach, the data structure for supporting the access point crowdsourcing data may be implemented as follows in Table 1. Note that this data structure may also be used for the upload to the server.

TABLE 1

| Data Structure of Collected GPS Data | |
|---|---|
| Observation time | Standard 64 bit UTC ms timestamp, or GPS time stamp |
| Location type | Location type may be any of the following: {locationTypeNone(0), locationTypeMsbasedGnss(1), locationTypePdeProvided(2), locationTypeAflt(3), locationTypeOtdoa(4), locationTypeOtherExternalSource(5), locationTypeOta(6), . . .} |
| Latitude | |
| Longitude | |
| Altitude | |
| Horizontal Uncertainty | |
| Vertical Uncertainty | |

Table 2 illustrates an exemplary data structure for describing access point observation data according to some aspects of the present disclosure.

TABLE 2

| Data Structure of Observation Data | |
|---|---|
| MAC Address | MAC address of AP |
| SSID | SSID of AP |
| Encryption Type | Encryption type, open, WEP, WPA, WPA-PSK, or EAP |
| RSSI | Observed RSSI in dBm |
| RTT | Observed RTT in units of nano seconds |
| Radio Spec | IEEE 802.11a. IEEE 802.11b, IEEE, 802.11g, IEEE, 802.11n, etc. |
| Frequency Band | Frequency band, 2.4 gHz or 5 gHz |
| Channel Number | Channel used by the network |
| Maximum Rate | Maximum data rate supported by the AP in Mbps |
| Network Type | Network type: AdHoc or Infrastructure |

In some implementations, data uploads can be controlled by an upload timer provided by the server as a configuration parameter. When the upload timer expires, the client may process collected data blocks for upload. If no data is available, the upload timer may be reset.

In some implementations, if a WiFi connection is available, the upload data can be sent to the server after it has been generated. If no WiFi connection is available, the crowdsourcing data to be uploaded can be stored until a WiFi connection is available. Whenever a WiFi connection is made, the client may check for available upload data.

The upload timer may be reset when the client receives a confirmation from the server of the data upload has been completed. Table 3 describes an exemplary data format for upload to a crowdsourcing server.

TABLE 3

| Information Element Name Access Point Database | Notes |
|---|---|
| >ApDataSets | maxNumOfObservedApSets = 4095 (for example) |
| >> observationTime | Standard 64 bit UTC ms timestamp corresponding to time of observing set of APs. |
| >>observationLocationType | Source of position estimate: {locationTypeNone(0), locationTypeMsbasedGnss(1), locationTypePdeProvided(2), locationTypeAflt(3), locationTypeOtdoa(4), locationTypeOtherExternalSource(5), locationTypeOta(6), locationTypeWifi(7), . . .} |
| >> observationPositionEstimate | Location at the time of making this AP observation |
| >>> latitude | Latitude at time of observation |
| >>> longitude | Longitude at time of observation |
| >>> altitude | Altitude at time of observation |
| >>> horUncertainty | K, where the horizontal position uncertainty in meters is a function of K. |
| >>> vertUncertainty | K, where the vertical position uncertainty in meters is a function of K. |
| >> perApRecords | Access point records. |

Figure 2:
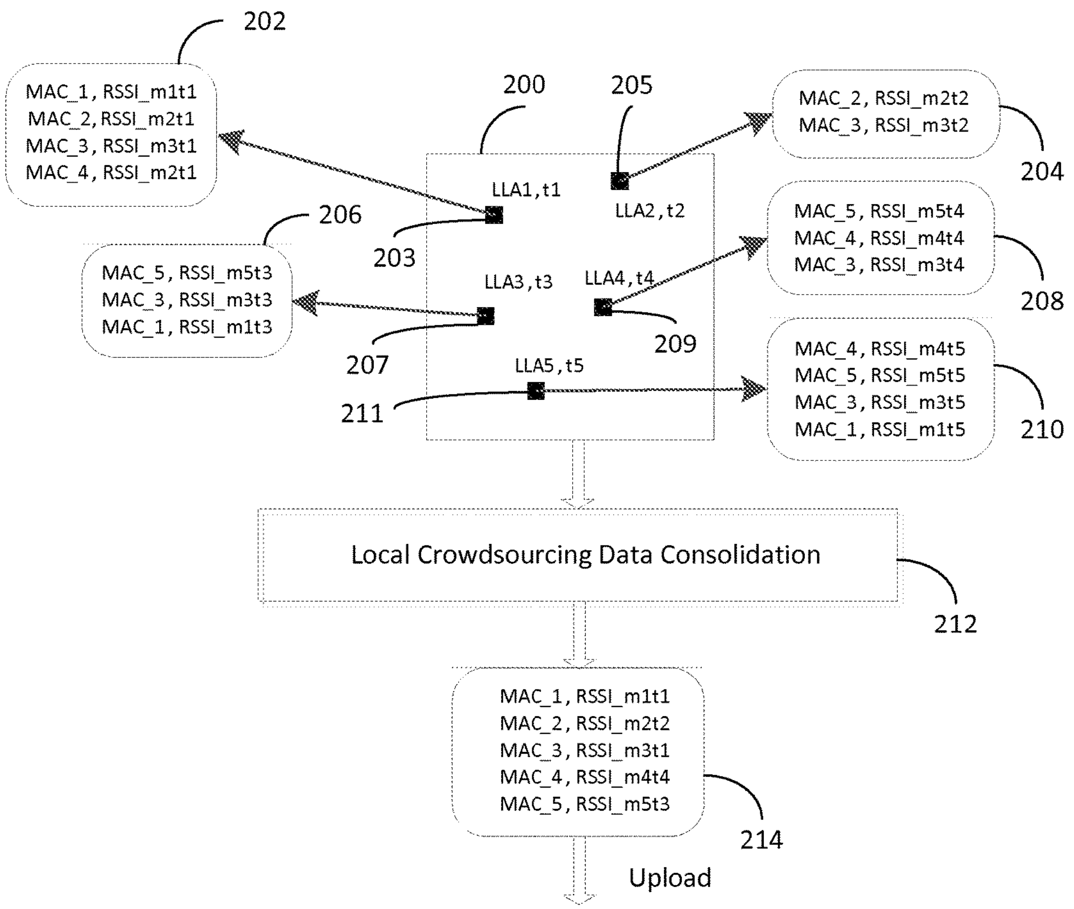
FIG. 2 illustrates an exemplary implementation of data quantization process according to some aspects of the present disclosure.

FIG. 2 illustrates an exemplary implementation of data quantization process according to some aspects of the present disclosure. In the example shown in FIG. 2, in a grid of a geographical area 200, five sets of observations (202, 204, 206, 208, and 210) have been made at five different times, namely t1, t2, t3, t4, and t5. The locations of the observations are indicated by latitude, longitude, altitude (LLA) of the mobile client at locations LLA1 (203), LLA2 (205), LLA3 (207), LLA4 (209) and LLA5 (211), respectively. The number of observations in each set of observations may then be reduced by a local crowdsourcing data consolidation process in block 212 to generate a set of observations 214 for upload.

The data consolidation process selects a subset of the collected data for upload. In one approach, the mobile client may receive the following configuration parameters from the crowdsourcing server to manage upload, including but not limited to: 1) maximum number of observation sets (WiFi scan lists) that may be uploaded in one day; 2) maximum number of observation sets that may be uploaded in a single upload; 3) tolerance for observation similarity; and 4) horizontal estimated position error (HEPE) values.

In some implementations, the tolerance for observation similarity may be set to 0 when two consecutive reported observation sets are entirely different. In this case, there are no APs in common and within a distance of more than 15 meters apart. In other implementations, the tolerance for observation similarity may be set to 100 when two consecutive reported observations are the same. In this case, the same set of APs is observed and they are within a distance of less than 10 meters.

In some implementations, the server may specify a HEPE value threshold. Scan lists with location data with HEPE value higher than the specified HEPE threshold may not be considered for upload unless the remaining scan lists can be uploaded. In other implementations, given two similar scan lists, the scan list with lower HEPE value can be selected for upload.

Note that the MNoO (Maximum number of observations) for a particular report may be the minimum of: 1) size limit per day multiplied by number of days since previous upload time, and 2) size limit per upload.

According to embodiments of the present disclosure, the total number of observations available for processing can be the sum of the observations in each data block, available from file headers. The following expression may be used to determine the similarity between two scan lists:

$$\left(\frac{AP_c}{AP_t} \times 50 + F_d \times 50\right)$$

where $AP_t$ is total number of discrete APs in both scan lists;

$AP_c$ is the number of APs in both scan lists;

$F_d$ is a function of the distance d, between the observations;

$F_d=1$ for $d \leq 5$ m;

$F_d=-0.1\ d+1.5$ for 5 m$<d<$15 m; and $F_d=0$ for $d \geq 15$ m.

Figure 3:
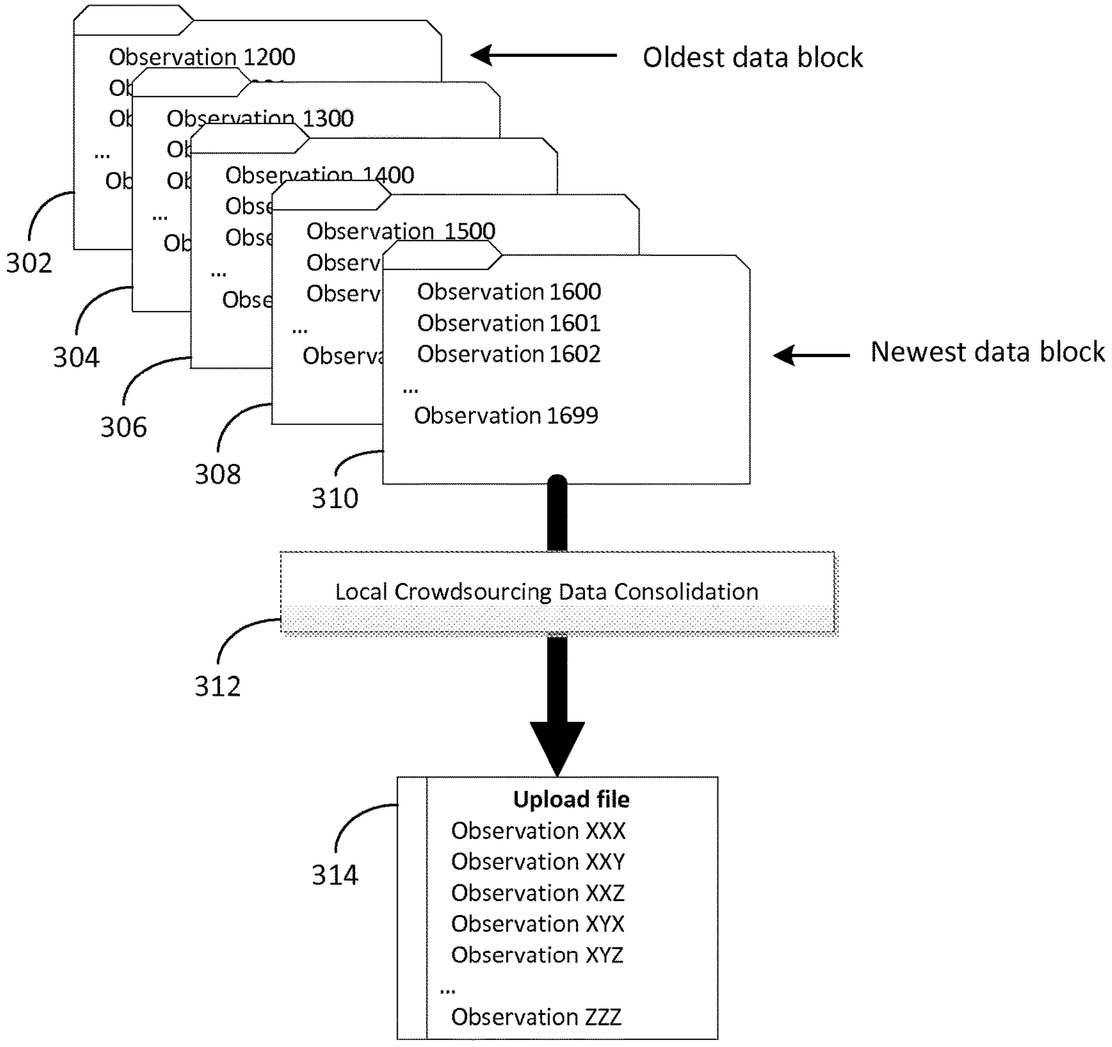
FIG. 3 illustrates an exemplary implementation of data consolidation process according to some aspects of the present disclosure.

FIG. 3 illustrates an exemplary implementation of data consolidation process according to some aspects of the present disclosure. As shown in FIG. 3, at each point in time, a series of observations may be made to gather information about access points based on the observations. Each series of observations may form a data block, such as 302, 304, 306, 308, and 310. The number of observations in each of the data blocks may then be reduced by a local crowdsourcing data consolidation process in block 312 to generate a set of observations 314 for upload.

In the example of FIG. 3, a mobile client can scan for nearby APs at a fairly high frequency, for example, some devices can do a scan every 30 seconds. there can be a lot of data stored in the mobile client's local database. To reduce the amount of data for upload, the raw AP crowdsourcing data may be quantized geographically. Since each AP may be observed by the same mobile client multiple times during a period from the same position or from many different positions. The amount of upload data may be reduced by configuring the mobile client to upload observations in each grid that have valid GPS fixes.

In addition, according to embodiments of the present disclosure, data quantization may be performed according to time segment of the crowdsourcing data collected. In this approach, the AP crowdsourcing data (AP scan lists with location fixes) can be collected in sequential blocks of data. A data block may be a fixed size, e.g., 100 scan lists, or for a fixed time period. In either case, the file header can indicate the number of scan lists, i.e., observation sets, in the data block. The data block structure may be used at the client for organizing data for local data cache management and selecting WiFi scan lists for upload. In one exemplary implementation, if the local data storage is full before data can be processed for upload, the oldest block of data may be deleted.

The client may further consolidate the AP crowdsourcing data by selecting the observations to be included in the data upload according to the following factors, including but not limited to: 1) similarity between scan lists; and 2) comparison of HEPE values to select between similar scan lists; 3) random selection based on ratio of MNoO (Maximum number of observations) to remaining unprocessed observations.

Figure 4:
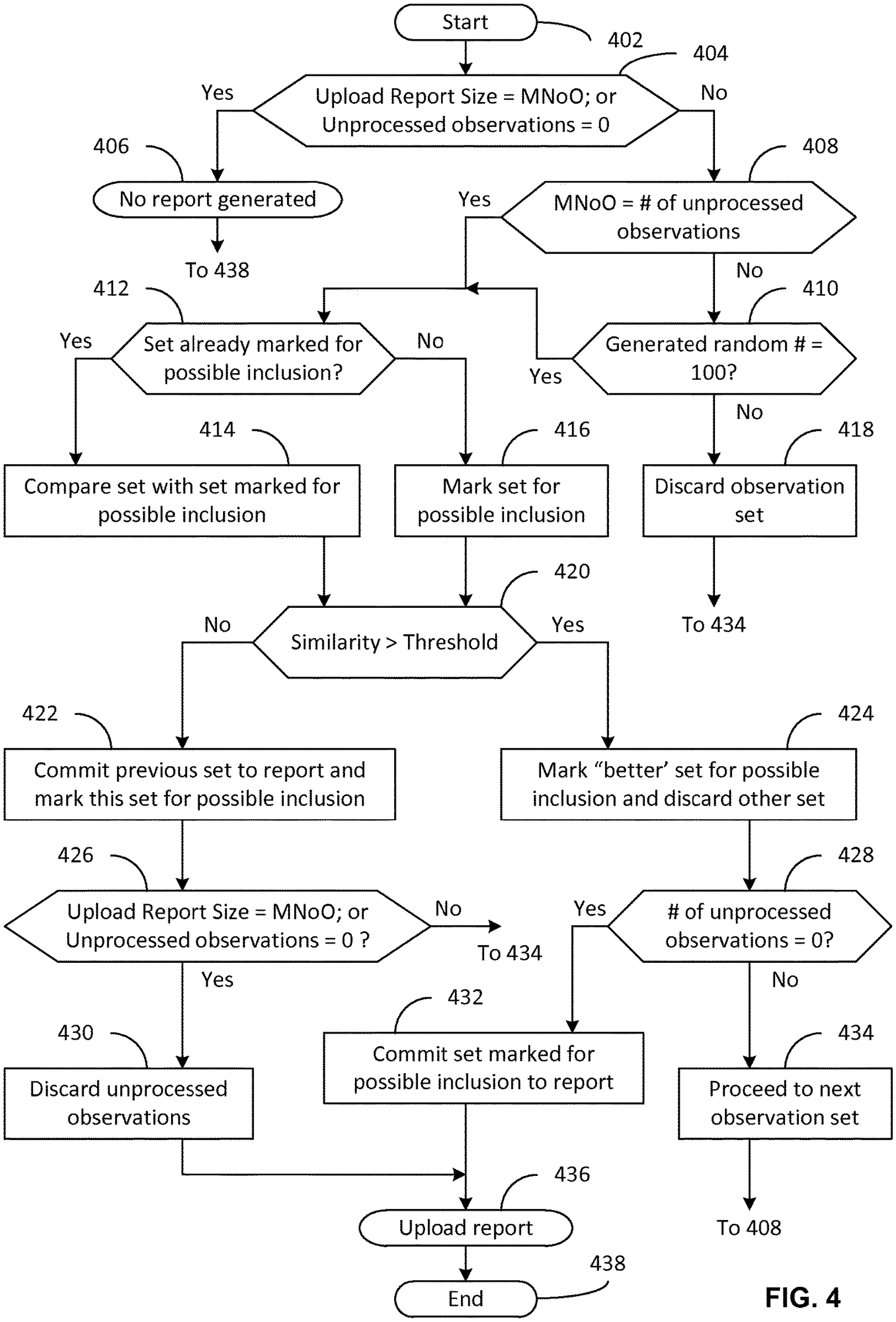
FIG. 4 illustrates a block diagram of an exemplary data aggregation method according to some aspects of the present disclosure.

FIG. 4 illustrates a block diagram of an exemplary data aggregation method according to some aspects of the present disclosure. The method starts in block 402. In block 404, it is determined whether the upload report size is equal to the maximum number of observations or the number of unprocessed observations is equal to zero. If the upload report size is equal to the maximum number of observations or the number of unprocessed observations is equal to zero (404_Yes), the method moves to block 406, where no report would be generated. The method moves from block 406 to block 438. Alternatively, if the upload report size is not equal to the maximum number of observations and the number unprocessed observations is not equal to zero (404_No), the method moves to block 408.

In block 408, it is determined whether the maximum number of observations is equal to the number of unprocessed observations. If the maximum number of observations is equal to the number of unprocessed observations (408_Yes), the method moves to block 412. Alternatively, if the maximum number of observations is not equal to the number of unprocessed observations (408_No), the method moves to block 410. In block 410, the method generates a random number and determines whether the random number is equal to 100. If the generated random number is equal to 100 (410_Yes), the method moves to block 412. On the other hand, if the generated random number is not equal to 100 (410_No), the method moves to block 418.

In block 412, it is determined whether there is a set already marked for possible inclusion. If whether there is a set already marked for possible inclusion (412_Yes), the method moves to block 414. Alternatively, whether there is not a set already marked for possible inclusion (412_No), the method moves to block 416. In block 414, the method compares the current set with the set already marked for possible inclusion and moves to block 420 afterwards. In block 416, the method marks the current set for possible inclusion, and moves to block 420 afterwards. In block 418, the method discards the observation set and moves to block 434.

In block 420, it is determined whether the similarity between the current set and the marked set for possible inclusion is greater than a predetermined threshold. If the similarity between the current set and the marked set for possible inclusion is greater than a predetermined threshold (420_Yes), the method moves to block 424. Else if the similarity between the current set and the marked set for possible inclusion is not greater than a predetermined threshold (420_No), the method moves to 422. In block 422, the method commits the previous set to report and marks the current set for possible inclusion. In block 424, the method marks a "better" set for possible inclusion based on the comparison in block 420 and discard the other set.

In block 426, it is determined whether the upload report size is equal to the maximum number of observations or the number of unprocessed observations is equal to zero. If the upload report size is equal to the maximum number of observations or the number of unprocessed observations is equal to zero (426_Yes), the method moves to block 430. On the other hand, if the upload report size is not equal to the maximum number of observations and the number of unprocessed observations is not equal to zero (426_No), the method moves to block 434. In block 428, it is determined whether the number of unprocessed observations is equal to zero. If the number of unprocessed observations is equal to zero (428_Yes), the method moves to block 432. Alternatively, if the number of unprocessed observations is not equal to zero (428_No), the method moves to block 434.

In block 430, the method discards unprocessed observations and moves to block 436. In block 432, the method commits the set marked for possible inclusion to report and moves to block 436. In block 434, the method proceeds to next observation set in block 408. In block 436, the method uploads the report and ends in block 438.

According to aspects of the present disclosure, a mobile client may select the observations to be included in the data upload using a combination of: 1) random selection based on ratio of MNoO (Maximum number of observations) to remaining unprocessed observations; 2) similarity between scan lists; and 3) comparison of HEPE values to select between 'similar' scan lists.

Figure 5:
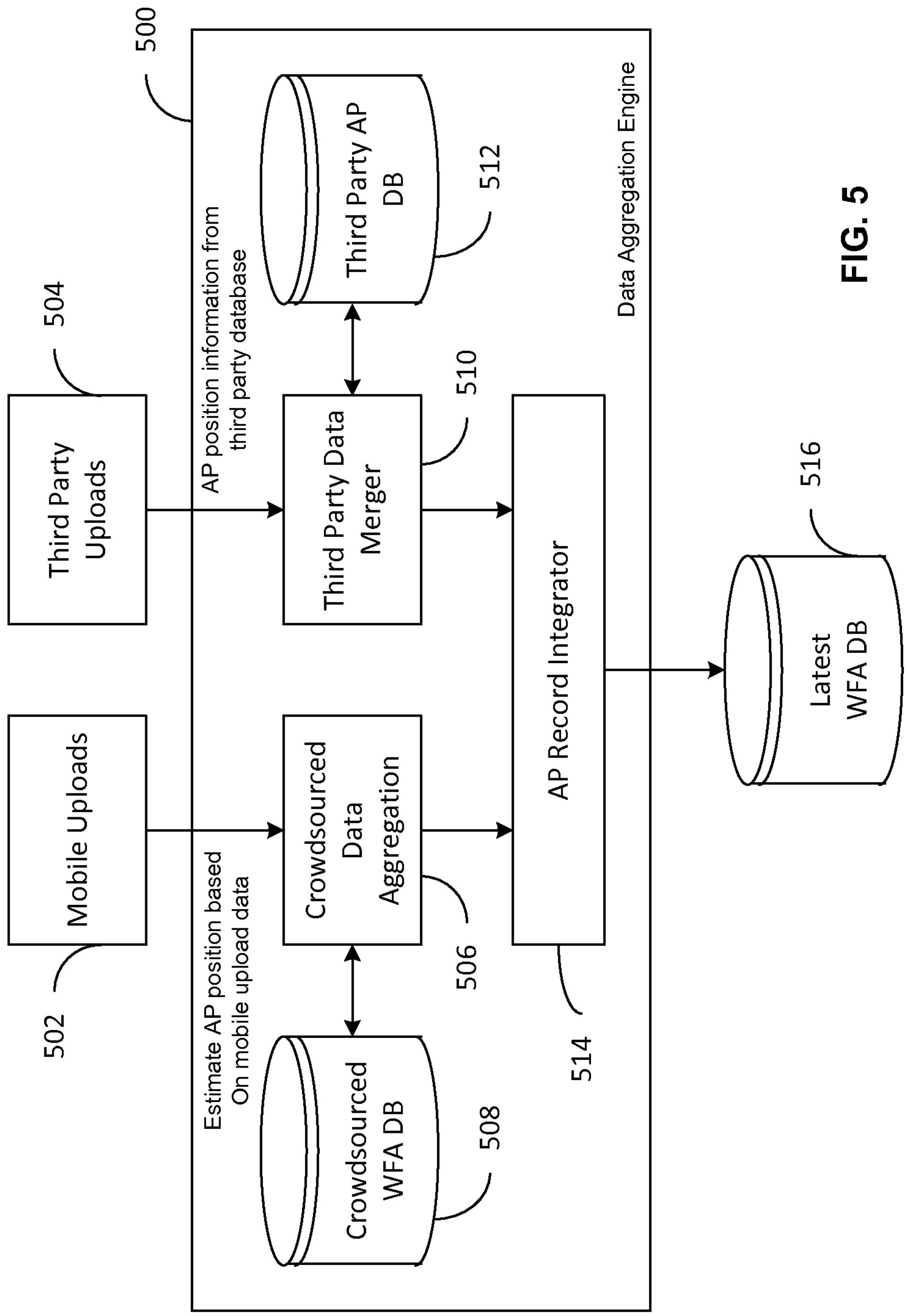
FIG. 5 illustrates a block diagram of an exemplary data aggregation engine according to some aspects of the present disclosure.

FIG. 5 illustrates a block diagram of an exemplary data aggregation engine according to some aspects of the present disclosure. In the example shown in FIG. 5, a data aggregation engine 500 includes crowdsourced data aggregation 506, crowdsourced WFA database 508, third party data merger 510, third party AP database 512, and AP record integrator 514. The crowdsourced data aggregation block 506 receives AP position information from mobile uploads 502 and stores the data in the crowdsourced WFA database 508. Similarly, the third party data merger 510 receives AP position information from third party uploads 504 and stores the data in the third party AP database 512. The AP record integrator 514 receives data from both the crowdsourced data aggregation block 506 and the third party data merger 510 and stores the integrated data in latest WFA database 516.

According to aspects of the present disclosure, the data accumulation process may be based on time limit and number of measurements. Various time limits on raw data may be implemented. In one exemplary implementation, the data accumulation process checks incoming mobile upload data with periodicity of a predetermined period (e.g. 1 day). Next, the process quantizes latitude and longitude of reported mobile position to approximate 0.0001 degree (10 m). The quantization resolution (i.e. the size of grids) can be configurable and can be adjusted depending on upload data density. For each mobile fix, the data accumulation process checks if the quantized grid is occupied. If occupied, the process puts the fix into this grid's measurement record, and increases this grid's number of measurement. Alternatively, the process adds this mobile fix to this grid's record (grid's number of measurement is 1) and increases the number of accumulated unique grids (numUniqueGrids) of this AP. Then, the process adds this AP to the aggregation AP list if sufficient data is accumulated (for example numUniqueGrids>=3). Next, the process adds the AP to the aggregation AP list if there is no sufficient data, but a predetermined maximum accumulation time is reached (for example 14 days). Last but not least, if the aggregation AP list is not empty, the process makes an aggregation request to aggregate data with the aggregation AP list.

According to aspects of the present disclosure, the third party data merger 510 can be configured to update the third party AP DB 512 when there are multiple injections of third party AP data, whether such data are received from the same provider or different providers. In the event of the multiple third party data injections are from the same provider, and then the old data is replaced by the new data. If the multiple third party data injections are from different providers, the third party data merger can be configured to choose a database as the primary database, and the other databases may be compared to the primary database. If a new AP record is found in other databases, that AP record can be added to the primary database. In some implementations, when the multiple 3rd party databases have a unified reliability level metric on each of their AP records, the AP record that has the highest reliability level may be selected by the third party data merger 510 and put into the third party AP DB 512.

According to aspects of the present disclosure, the crowdsourced data aggregation block 506 and the third party data merger 510 can be two parallel operations. At the end of each operation process, the result can be saved in their own database respectively. The newest results from both operations can be combined by the AP record integrator 514. Note that the estimation result that can be made available from the data aggregation engine 500 is a combined result.

In some implementations, the AP record integrator 514 may be configured to perform the following tasks. First, the AP record integrator 514 can be configured to estimate the integrated result using crowdsourced data made available to the AP record integrator 514 when the data aggregation engine is publishing the integrated result. AP position records based on third party database may be made available to the AP record integrator 514 after the data has been provided by the third party. Note that initially, when there is no AP estimation result based on crowdsourcing available, third party DB's AP records may be cached in in the AP record integrator 514 and then stored in the latest WFA DB 516. If there is no record for an AP in third party database 512, but the crowdsourced data aggregation block 506 has the AP's estimation result, then the AP record integrator may be configured to use results from the crowdsourced data aggregation block. If results from both third party database 512 and the crowdsourced WFA DB are available, the AP record integrator 514 may be configured to choose results from the crowdsourced WFA DB 508 through the crowdsourced data aggregation block 506.

Figure 6:
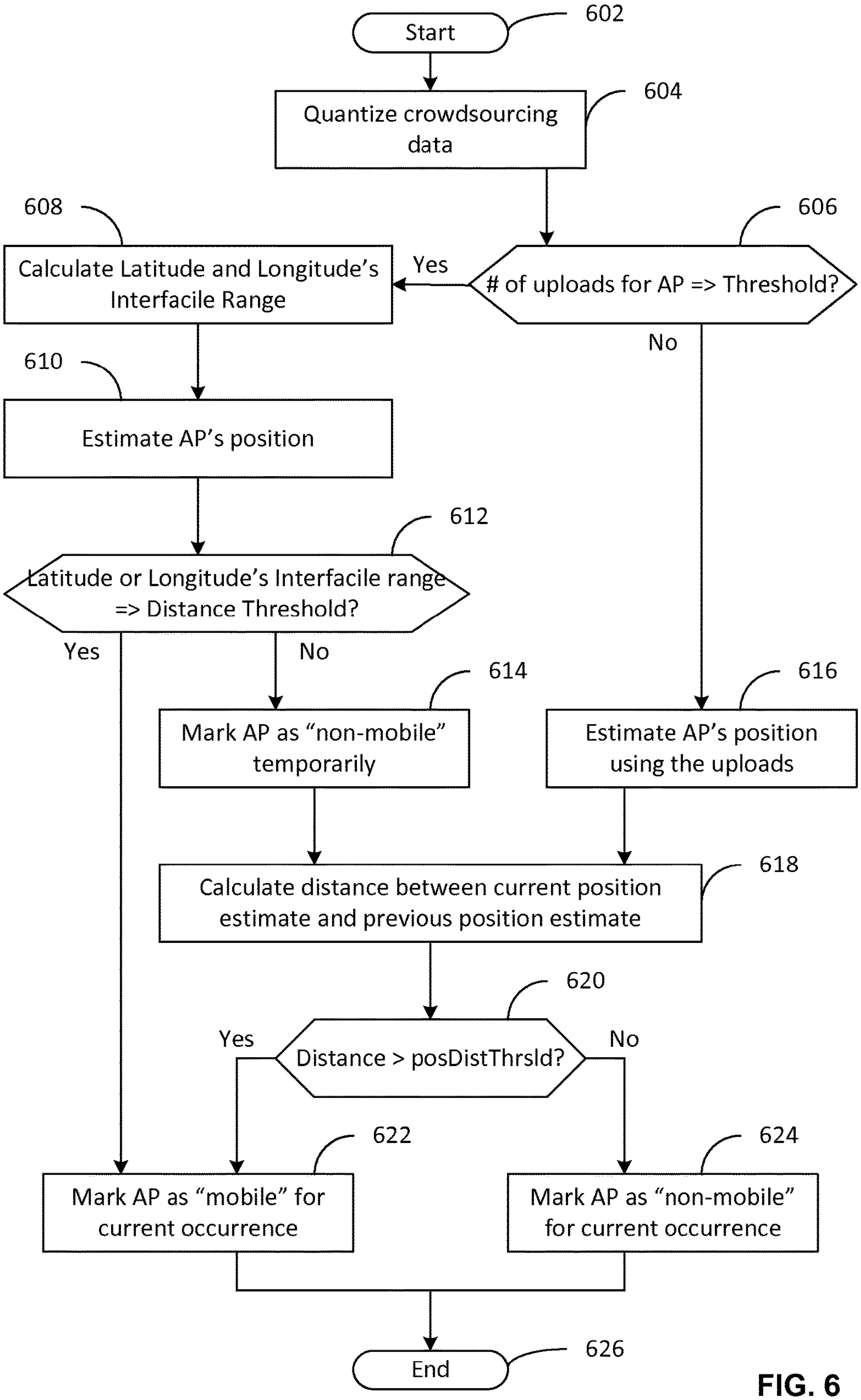
FIG. 6 illustrates an exemplary implementation of detecting mobile access points according to some aspect of the present disclosure.

FIG. 6 illustrates an exemplary implementation of detecting mobile access points according to some aspect of the present disclosure. The method starts in block 602 and moves to block 604 where crowdsourcing data has been quantized and stored. In block 606, it is determined whether the number of uploads for access points is greater than or equal to a predetermined threshold. If the number of uploads for access points is greater than or equal to the predetermined threshold (606_Yes), the method moves to block 608. Alternatively, if the number of uploads for access points is less than the predetermined threshold (606_No), the method moves to block 616. In block 608, the method calculates latitude's interfracile range and longitude's interfracile range. In block 610, the method estimates the access point's position using uploads inside the latitude's interfracile range and longitude's interfracile range.

In block 612, it is determined whether the latitude's interfracile range or longitude's interfracile range is greater than or equal to a predetermined distance threshold (for example 1 Kilometers). If the latitude's interfracile range or longitude's interfracile range is greater than or equal to the predetermined distance threshold (612_Yes), the method moves to block 622. If the latitude's interfracile range or longitude's interfracile range is less than the predetermined distance threshold (612_No), the method moves to block 614. In block 614, the method marks the AP as "non-mobile" temporarily and moves to block 618. In block 616, the method estimates AP's position using uploads, and then moves to block 618. In block 618, the method calculates distance between the current position estimate and a previous position estimate; and then moves to block 620.

In block 620, it is determined whether the distance is greater than a predefined position distance threshold (for example 1 Kilometers). If the distance is greater than a predefined position distance threshold (620_Yes), the method moves to block 622. On the other hand, if the distance is not greater than a predefined position distance threshold (620_No), the method moves to block 624. In block 622, the method marks the AP as "mobile" for the current occurrence. In block 624, the method marks the AP as "non-mobile" for the current occurrence. The method ends in block 626.

According to embodiments of the present disclosure, if there are enough number of mobile uploads on an AP (for example >20 mobile uploads), the interfracile range of the data set both on latitude and longitude may be used to determine the geometrical dispersion of the mobile uploads. If either the latitude's interfracile range or the longitude's interfracile range is greater than a predetermined threshold (for example 2 Km), that means the crowdsourcing data on the AP has enough spread so that AP is deemed to be a mobile AP. In some implementations, the interfracile range may be the difference between the first 5% and the last 5% (5% and 95%). The interfracile range may be a measure of statistical dispersion of the values in a set of data. For another example, if the position estimate of an AP using a mean positioning algorithm has changed 1 Km from a previous day, then the AP may be identified as a mobile AP.

According to some embodiments of the present disclosure, a mobile AP detection method may be implemented as follows. First, the method checks the number of mobile upload for the AP in a batch of uploads within a predetermined period such as a day. If the number of mobile upload is greater than or equal to 20, then the method calculates both the latitude's and the longitude's interfracile range. If either of these interfracile ranges is larger than a predetermined threshold distance (for example 2 Km), then a mobile AP detection counter corresponding to the AP can be incremented by 1. In addition, position estimation for the AP may be performed. If neither of these interfracile ranges is larger than the predetermined threshold distance, the method calculates the position estimate based on the whole batch of uploads and determines a position estimate for the AP. If the number of mobile upload is less than 20, the method calculates the position estimate based on the whole batch of uploads and determines a position estimate for the AP.

According to aspects of the present disclosure, when the next batch of data arrives, for example on the next day, the method checks the mobile AP detection counter, if there are more or equal occurrences of the AP than a predetermined threshold within a detection window of time, then the method marks the AP as a mobile AP. If there are less occurrences of the AP than a predetermined threshold within a detection window of time, then the method continues with the following determinations.

In some implementations, if number of mobile upload is greater than or equal to 20, then the method calculates both the Latitude's and the Longitude's interfracile range based on: a) if either of these interfracile ranges is larger than 2 Km, then that AP's Mobile AP detection counter will be increased by 1; b) if neither of these interfracile ranges is larger than 2 Km, the method calculates the position estimate based on the whole batch of uploads and determines a position estimate for the AP. If the distance between the new position estimate and the previous position estimate is larger than 1 Km, the method increases that AP's Mobile AP detection counter by 1.

Alternatively, if the number of mobile upload is less than 20, the method calculates the position estimate based on the batch of uploads and determines a position estimate for the AP. If the distance between the new position estimate and the previous position estimate is larger than 1 Km, the method increments the AP's mobile AP detection counter by 1.

The method processes each batch of data within the sliding mobile AP detection window according to the methods described above. When the mobile AP detection counter reaches the predetermined threshold (for example 3), the method marks the AP as a mobile AP.

Figure 7:
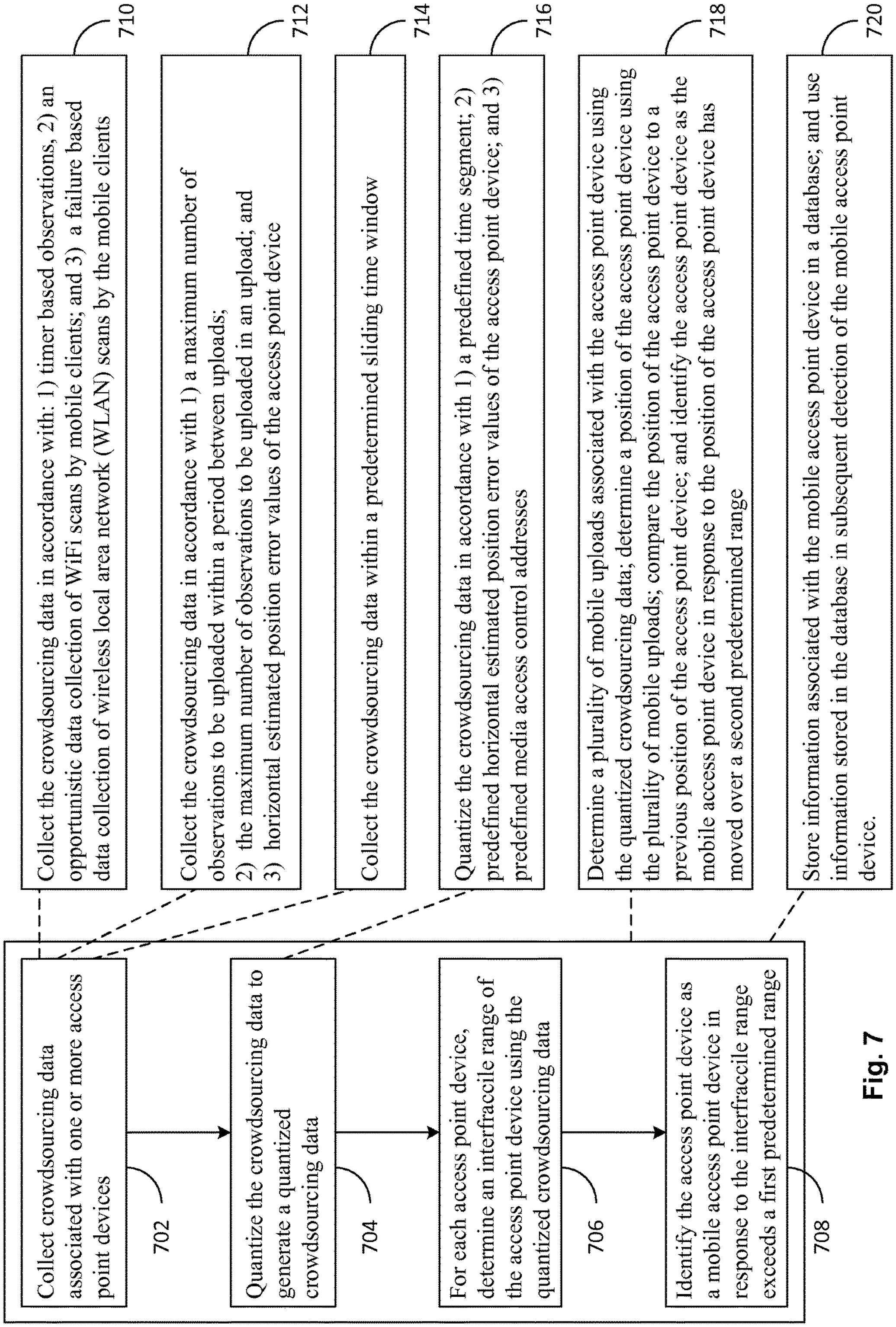
FIG. 7 illustrates another exemplary implementation of detecting mobile access points according to some aspects of the present disclosure.

FIG. 7 illustrates another exemplary implementation of detecting mobile access points according to some aspects of the present disclosure. In block 702, one or more processors 137 and crowdsourcing data manager 128 can be configured to collect crowdsourcing data associated with one or more access point devices. In block 704, one or more processors 137 and data aggregation module 136 can be configured to quantize the crowdsourcing data to generate a quantized crowdsourcing data. In block 706, for each access point device, one or more processors 137 and data aggregation module 136 can be configured to determine an interfracile range of the access point device using the quantized crowdsourcing data, where the interfracile range is a measure of a statistical dispersion of the quantized crowdsourcing data with respect to the access point device. In block 708, one or more processors 137 and data aggregation module 136 can be configured to identify the access point device as a mobile access point device in response to the interfracile range exceeds a first predetermined range. The interfracile range comprises at least one of latitude range and longitude range of the access point device. The statistical dispersion comprises a predetermined upper range and a predetermined lower range.

According to some aspects of the present disclosure, logic implemented in block 702 may further include logic implemented in blocks 710, 712 and 714. In block 710, the one or more processors 137 and the crowdsourcing data manager 128 can be configured to collect the crowdsourcing data in accordance with 1) timer based observations; 2) an opportunistic data collection of WiFi scans by mobile clients; and 3) a failure based data collection of wireless local area network (WLAN) scans by the mobile clients. In block 712, the one or more processors 137 and the crowdsourcing data manager 128 can be configured to collect the crowdsourcing data in accordance with 1) a maximum number of observations to be uploaded within a period between uploads; 2) the maximum number of observations to be uploaded in an upload; and 3) horizontal estimated position error values of the access point device. In block 712, the one or more processors 137 and the crowdsourcing data manager 128 can be configured to collect the crowdsourcing data in accordance with a predetermined sliding time window.

According to some aspects of the present disclosure, logic implemented in block 704 may further include logic implemented in block 716. In block 716, the one or more processors 137 and the data aggregation module 136 can be configured to quantize the crowdsourcing data in accordance with 1) a predefined time segment; 2) predefined horizontal estimated position error values of the access point device; and 3) predefined media access control addresses.

According to some aspects of the present disclosure, the processors 137 can be configured to determine a plurality of mobile uploads associated with the access point device using the quantized crowdsourcing data, determine a position of the access point device using the plurality of mobile uploads, compare the position of the access point device to a previous position of the access point device, and identify the access point device as the mobile access point device in response to the position of the access point device has moved over a second predetermined range as shown in block 718.

According to some aspects of the present disclosure, the processors 137 can further be configured to store information associated with the mobile access point device in a database, and use information stored in the database in subsequent detection of the mobile access point device as shown in block 720.

Figure 8:
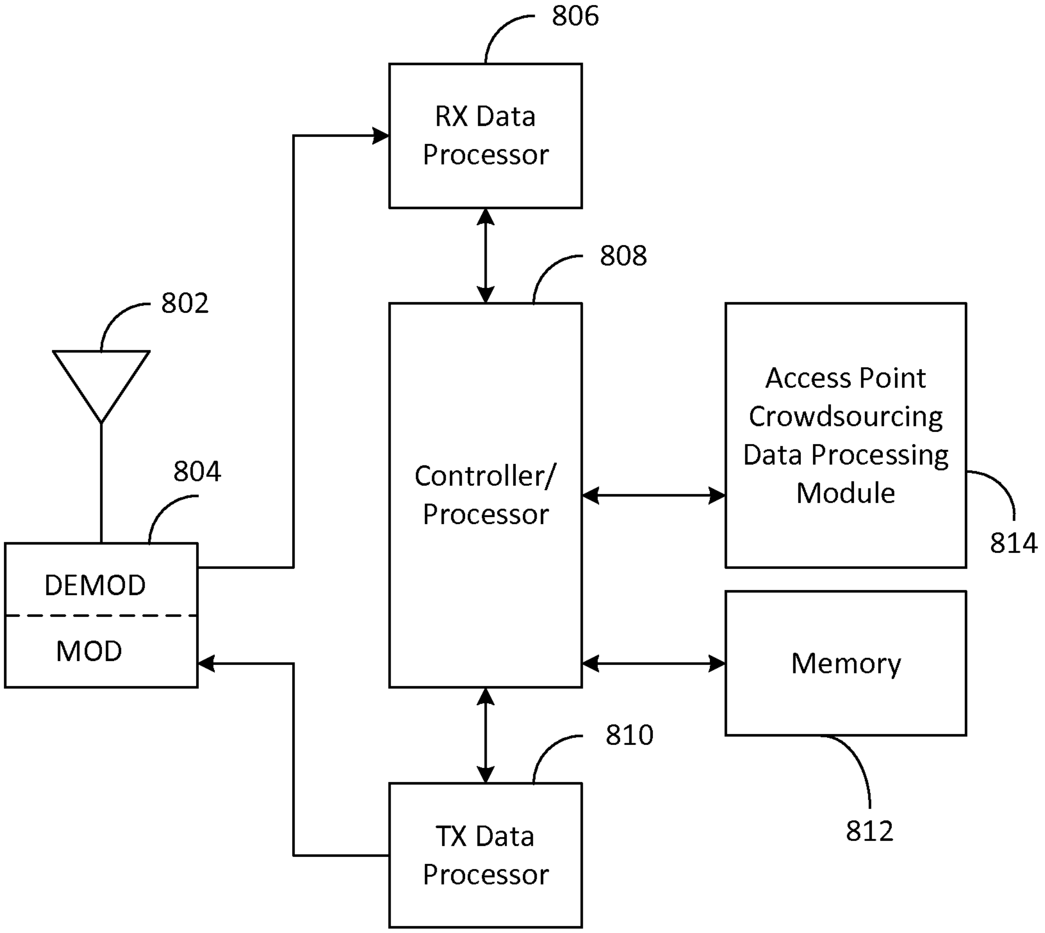
FIG. 8 illustrates an exemplary block diagram of an apparatus for processing of access point crowdsourcing data according to some aspects of the present disclosure.

FIG. 8 illustrates an exemplary block diagram of an apparatus for processing of access point crowdsourcing data according to some aspects of the present disclosure. In some embodiments, the apparatus illustrated in FIG. 8 and/or described below may be used to implement a server in FIG. 1B, for example the crowdsourcing server 126. In some embodiments, the apparatus illustrated in FIG. 8 and/or described below may be used to implement a mobile client in FIG. 1A, for example the mobile client 100. As shown in FIG. 8, antenna 802 receives modulated signals from a base station and provides the received signals to a demodulator (DEMOD) part of a modem 804. The demodulator processes (e.g., conditions and/or digitizes) the received signal and obtains input samples. It may further perform orthogonal frequency-division multiplexing (OFDM) demodulation on the input samples and provide frequency-domain received symbols for all subcarriers. An RX data processor 806 processes (e.g., symbol de-maps, de-interleaves, and/or decodes) the frequency-domain received symbols and provides decoded data to a controller/processor 808 of the apparatus. In some implementations, the antenna 802 may be configured to receive and/or transmit GPS signals or other SPS signals from one or more satellites. In some embodiments, the apparatus includes a separate antenna (not illustrated) to receive such GPS or other SPS signals. Further, separate receive and/or processing circuitry and/or software may be included in the apparatus to process these signal, and may be in communication with the controller/processor 808, memory 812, and/or access point crowdsourcing data processing module 814.

The controller/processor 808 can be configured to control the apparatus to communicate with another device via a wireless network. A TX data processor 810 may generate signaling symbols, data symbols, and/or pilot symbols, for example, which can be processed by modulator (MOD) of modem 804 and transmitted via the antenna 802, for example to a base station or directly to another device. In addition, the controller/processor 808 directs the operation of various processing units at the apparatus. Memory 812 can be configured to store program codes and data for the apparatus. Access point crowdsourcing data processing module 814 can be configured to perform methods of processing crowdsourcing data processing described herein. For example, access point crowdsourcing data processing module 814 and/or controller/processor 808 may be used to implement one or more of blocks 702-720 illustrated in FIG. 7. As another example, access point crowdsourcing data processing module 814 and/or controller/processor 808 may be used to implement one or more of blocks 902-918 illustrated in FIG. 9. In some implementations, portions of the functionalities of the controller/processor 808 and access point crowdsourcing data processing module 814 may be implemented in multiple apparatuses, such as in one or more mobile devices and/or servers. In some other implementations, controller/processor 808 and access point crowdsourcing data processing module 814 may reside in a server to implement methods of processing crowdsourcing data described in association with FIG. 1B. In some other implementations, controller/processor 808 and access point crowdsourcing data processing module 814 may reside in a mobile device to implement methods of processing crowdsourcing data described in association with FIG. 1A. While the access point crowdsourcing data processing module 814 is illustrated separate from other elements in the apparatus shown in FIG. 8, the access point crowdsourcing data processing module 814 may be wholly or partially implemented by other elements illustrated in FIG. 8, for example in the controller/processor 808 and/or memory 812, or in another processor and/or memory of the apparatus or in one or more other elements of the apparatus.

Figure 9:
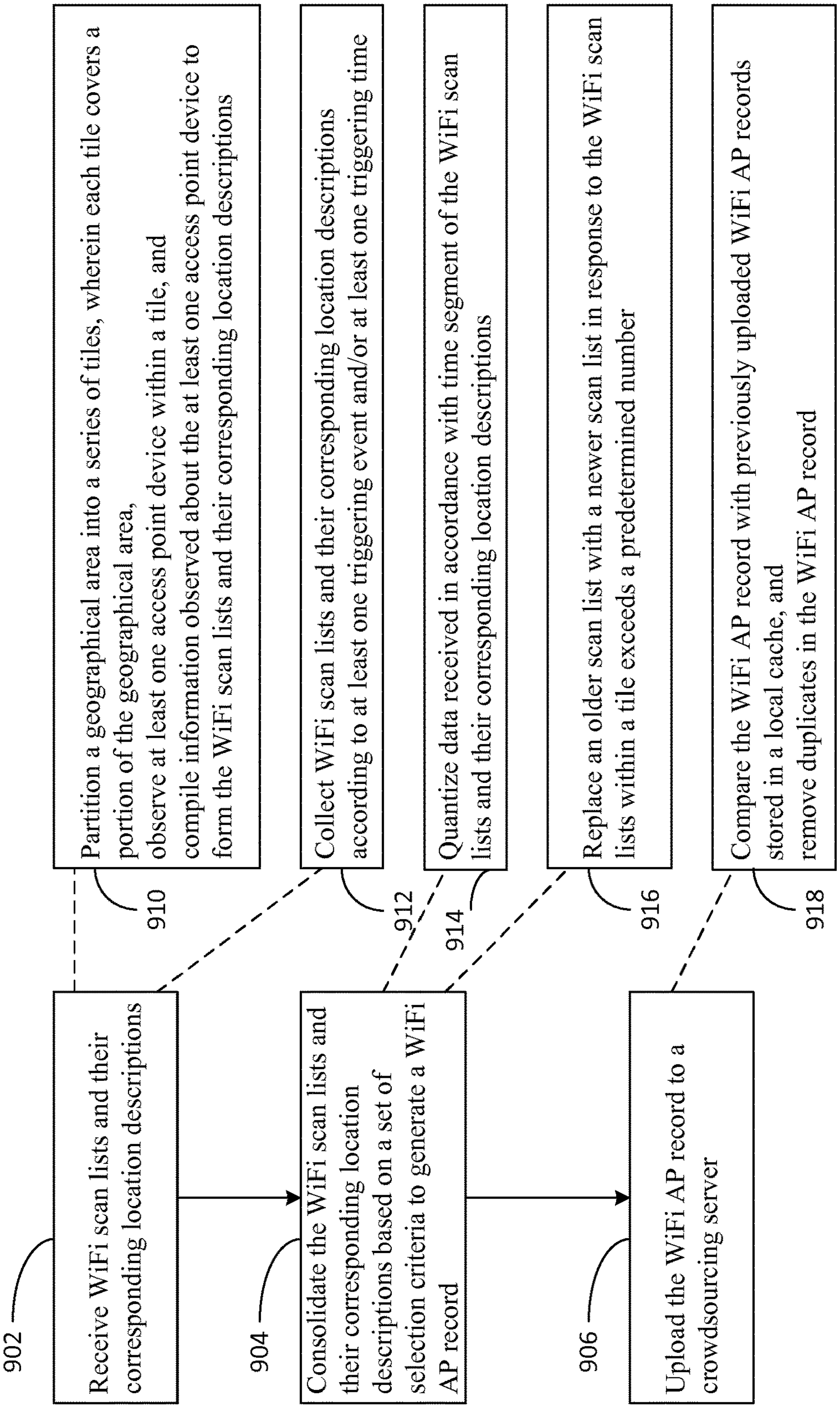
FIG. 9 illustrates a flow chart of processing access point crowdsourcing data according to some aspects of the present disclosure.

FIG. 9 illustrates a flow chart of processing access point crowdsourcing data according to some aspects of the present disclosure. In block 902, the mobile client can be configured to receive WiFi scan lists and their corresponding location descriptions. In block 904, the mobile client can be configured to consolidate the WiFi scan lists and their corresponding location descriptions based at least in part on a set of selection criteria to generate a WiFi AP record. In block 906, the mobile client can be configured to upload the WiFi AP record to a crowdsourcing server.

According to embodiments of the present disclosure, the methods performed in block 902 may further include methods performed in block 910. For example, in block 910, the mobile client can be configured to partition a geographical area into a series of tiles, where each tile covers a portion of the geographical area, observe at least one access point device within a tile, and compile information observed about the at least one access point device to form the WiFi scan lists and their corresponding location descriptions.

Note that the information observed about the at least one access point device includes observation time, latitude, longitude, altitude, horizontal uncertainty, and vertical uncertainty of the at least one access point being observed. The information observed about the at least one access point device further includes MAC address, SSID, RSSI, RTT, radio specification, and frequency band. The location descriptions include at least one of GNSS position measurement information and non-GNSS position measurement information.

The methods performed in block 902 may further include methods performed in block 912. In block 912, the mobile client can be configured to collect WiFi scan lists and their corresponding location descriptions according to at least one triggering event and/or at least one triggering time. The at least one triggering event includes a successful GNSS fix by a client, a WiFi scan by the client, and a failed GNSS fix by the client.

The methods performed in block 904 may further include methods performed in blocks 914 and 916. In block 914, the mobile client can be configured to quantize data received in accordance with time segment of the WiFi scan lists and their corresponding location descriptions. In block 916, the mobile client can be configured to replace an older scan list with a newer scan list in response to the WiFi scan lists within a tile exceeds a predetermined number.

The set of selection criteria includes a maximum number of scan lists to be uploaded in a predetermined period of time, and a maximum number of scan lists to be uploaded in a single upload. The set of selection criteria further includes ratio of MNoO to remaining unprocessed observations, similarity between scan lists, and comparison of HEPE values between similar scan lists.

The methods performed in block 906 may further include methods performed in blocks 918. In block 918, the mobile client can be configured to compare the WiFi AP record with previously uploaded WiFi AP records stored in a local cache, and remove duplicates in the WiFi AP record.

Note that at least the following three paragraphs, FIGS. 1A-1B, FIG. 9 and their corresponding descriptions provide means for receiving WiFi scan lists and their corresponding location descriptions, means for consolidating the WiFi scan lists and their corresponding location descriptions based at least in part on a set of selection criteria to generate a WiFi AP record, and means for uploading the WiFi AP record to a crowdsourcing server. At least the folloing three paragraphs, FIG. 1B, FIG. 9 and their corresponding descriptions provide means for partitioning a geographical area into a series of tiles, wherein each tile covers a portion of the geographical area, means for observing at least one access point device within a tile, means for compiling information observed about the at least one access point device to form the WiFi scan lists and their corresponding location descriptions, means for collecting WiFi scan lists and their corresponding location descriptions according to at least one triggering event, and means for collecting WiFi scan lists and their corresponding location descriptions according to at least one triggering time. At least the following three paragraphs, FIGS. 1A-1B, FIG. 9 and their corresponding descriptions provide means for quantizing data received in accordance with time segment of the WiFi scan lists and their corresponding location descriptions, and means for replacing an older scan list with a newer scan list in response to the WiFi scan lists within a tile exceeds a predetermined number. At least the following three paragraphs, FIG. 9 and their corresponding descriptions provide means for comparing the WiFi AP record with previously uploaded WiFi AP records stored in a local cache, and means for removing duplicates in the WiFi AP record.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data can be configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of processing access point (AP) crowdsourcing data, comprising:

receiving WiFi scan lists and their corresponding location descriptions, wherein the WiFi scan lists and their corresponding location descriptions, include information observed about at least one access point device;

consolidating the WiFi scan lists and their corresponding location descriptions based at least in part on a set of selection criteria to generate a WiFi AP record, comprising quantizing the WiFi scan lists received in accordance with media access control address and service set identifier of the at least one access point device in the WiFi scan lists, wherein the set of selection criteria comprises a maximum number of scan lists to be uploaded in a predetermined period of time and the maximum number of scan lists to be uploaded in a single upload; and uploading the WiFi AP record to a crowdsourcing server.

2. The method of claim 1, wherein consolidating the WiFi scan lists and their corresponding location descriptions comprises:

replacing an older scan list with a newer scan list in response to a number of the WiFi scan lists within a tile exceeds a predetermined number.

3. The method of claim 1, wherein the set of selection criteria further comprises:

ratio of maximum number of observations to remaining unprocessed observations.

4. The method of claim 1, wherein the set of selection criteria further comprises:

similarity between scan lists; and comparison of horizontal estimated position error values between similar scan lists.

5. The method of claim 1, wherein consolidating the WiFi scan lists and their corresponding location descriptions further comprises:

quantizing the WiFi scan lists received in accordance with time segment of the WiFi scan lists and their corresponding location descriptions.

6. The method of claim 1, wherein uploading the WiFi AP record to the crowdsourcing server comprises:

comparing the WiFi AP record with previously uploaded WiFi AP records stored in a local cache; and removing duplicates in the WiFi AP record.

7. The method of claim 6, further comprising:

for each access point device in the WiFi AP record, determining an interfracile range of the access point device, wherein the interfracile range of the access point device is a measure of statistical dispersion of ranges of latitude or longitude movements of the access point device; and identifying the access point device as a mobile access point device in response to the interfracile range exceeds a first predetermined range.

8. The method of claim 7, further comprising:

storing information associated with the mobile access point device in a database; and using information stored in the database in subsequent detection of the mobile access point device.

9. An apparatus for processing access point (AP) crowdsourcing data, comprising:

one or more processors, an access point crowdsourcing data processing module configured to work with the one or more processors, wherein the access point crowdsourcing data processing module includes a receiver configured to receive WiFi scan lists and their corresponding location descriptions, wherein the WiFi scan lists and their corresponding location descriptions include information observed about at least one access point device;

a data consolidation module configured to consolidate the WiFi scan lists and their corresponding location descriptions based at least in pan on a set of selection criteria to generate a WiFi AP record, the data consolidation module further comprises logic configured to quantize the WiFi scan lists received in accordance with media access control address and service set identifier of the at least one access point device in the WiFi scan lists, wherein the set of selection criteria comprises a maximum number of scan lists to be uploaded in a predetermined period of time and the maximum number of scan lists to be uploaded in a single upload; and an upload manager configured to upload the WiFi AP record to a crowdsourcing server; and a memory configured to store the WiFi AP record.

10. The apparatus of claim 9, wherein the data consolidation module configured to consolidate the WiFi scan lists and their corresponding location descriptions comprises:

logic configured to replace an older scan list with a newer scan list in response to a number of the WiFi scan lists within a tile exceeds a predetermined number.

11. The apparatus, of claim 9, wherein the set of selection criteria further comprises:

ratio of maximum number of observations to remaining unprocessed observations.

12. The apparatus of claim 9, wherein the set of selection criteria further comprises:

similarity between scan lists; and comparison of horizontal estimated position error values between similar scan lists.

13. The apparatus of claim 9, wherein the data consolidation module configured to consolidate the WiFi scan lists and their corresponding location descriptions further comprises:

logic configured to quantize the WiFi scan lists received in accordance with time segment of the WiFi scan lists and their corresponding location descriptions.

14. The apparatus of claim 9, wherein the upload manager further comprises:

logic configured to compare the WiFi AP record with previously uploaded WiFi AP records stored in a local cache; and logic configured to remove duplicates in the WiFi AP record.

15. The apparatus of claim 14, thither comprising:

for each access point device, in the WiFi AP record, logic configured to determine an interfracile range of the access point device, wherein the interfracile range of the access point device is a measure of statistical dispersion of ranges of latitude or longitude movements of the access point device; and logic configured to identify the access point device as a mobile access point device in response to the interfracile range exceeds a first predetermined range.

16. The apparatus of claim 15, further comprising:

logic configured to store information associated with the mobile access point device in a database; and logic configured to use information stored in the database in subsequent detection of the mobile access point device.

17. A non-transitory medium storing instructions of processing access point (AP) crowdsourcing data for execution by one or more computer systems, the instructions comprising:

instructions for receiving WiFi scan lists and their corresponding location descriptions, wherein the WiFi scan lists and their corresponding location descriptions include information observed about at least one access point device;

instructions for consolidating the WiFi scan lists and their corresponding location descriptions based at least in part on a set of selection criteria to generate a WiFi AP record, further comprising instructions for quantizing the WiFi scan lists received in accordance with media access control address and service set identifier of the at least one access point device in the WiFi scan lists, wherein the set of selection criteria comprises a maximum number of scan lists to be uploaded in a predetermined period of time and the maximum number of scan lists to be uploaded in a single upload; and instructions for uploading the WiFi AP record to a crowdsourcing server.

18. The non-transitory medium of claim 17, wherein instructions for consolidating the WiFi scan lists and their corresponding location descriptions comprises:

instructions for replacing art older scan list with a newer scan list in response to a number of the WiFi scan lists within a tile exceeds a predetermined number.

19. The non-transitory medium of claim 17, wherein the set of selection criteria further comprises:

ratio of maximum number of observations to remaining unprocessed observations.

20. The non-transitory medium of claim 17, wherein the set of selection criteria further comprises:

similarity between scan lists; and comparison of horizontal estimated position error values between similar scan lists.

21. The non-transitory medium of claim 17, wherein instructions for consolidating the WiFi scan lists and their corresponding location descriptions further comprises:

instructions for quantizing the WiFi scan lists received in accordance with time segment of the WiFi scan lists and their corresponding location descriptions.

22. The non-transitory medium of claim 17, wherein instructions for uploading the WiFi AP, record to the crowdsourcing server comprises:

instructions for comparing the WiFi AP record with previously uploaded WiFi AP records stored in a local cache; and instructions for removing duplicates in the WiFi AP record.

23. The non-transitory medium of claim 22, further comprising:

for each access point device in the WiFi AP record, instructions for determining an interfracile range of the access point device, wherein the interfracile range of the access point device is a measure of statistical dispersion of ranges of latitude or longitude movements of the access point device; and instructions for identifying the access point device as a mobile access point device in response to the interfracile range exceeds a first predetermined range.

24. The non-transitory medium of claim 23, further comprising:

instructions for storing information associated with the mobile access point device in a database; and instructions for using information stored in the database in subsequent detection of the mobile access point device.

25. An apparatus for processing access point (AP) crowdsourcing data, comprising:

means for receiving Win scan lists and their corresponding location descriptions, wherein the WiFi scan lists and their corresponding location descriptions include information observed about at least one access point device;

means for consolidating the WiFi scan lists and their corresponding location descriptions based at least in part on a set of selection criteria to generate a WiFi AP record, further comprising means for quantizing the WiFi scan lists received in accordance with media access control address and service set identifier of the at least one access point device in the WiFi scan lists, wherein the set of selection criteria comprises a maximum number of scan lists to be uploaded in a predetermined period of time and the maximum number of scan lists to be uploaded in a single upload; and means for uploading the WiFi AP record to a crowdsourcing server.

26. The apparatus of claim 25, wherein means for consolidating the WiFi scan lists and their corresponding location descriptions comprises;

means far replacing an older scan list with a newer scan list in response to a number of the WiFi scan lists within a tile exceeds a predetermined number.

27. The apparatus of claim 25, wherein means for consolidating the WiFi scan lists and their corresponding location descriptions further comprises:

means for quantizing the WiFi scan lists received in accordance with time segment of the WiFi scan lists and their corresponding location descriptions.

28. The apparatus of claim 25, wherein means for uploading the WiFi AP record to the crowdsourcing server comprises:

means for comparing the WiFi AP record with previously uploaded WiFi AP records stored in a local cache; and means for removing duplicates in the WiFi AP record.

29. The apparatus of claim 28, further comprising:

for each access point device in the WiFi AP record, means for determining an interfracile range of the access point device, wherein the interfracile range of the access point device is a measure of statistical dispersion of ranges of latitude or longitude movements of the access point device; and means for identifying the access point device as a mobile access point device in response to the interfracile range exceeds a first predetermined range.

30. The apparatus of claim 29, further comprising:

means fir storing information associated with the mobile access point device in a database; and means for using information stored in the database in subsequent detection of the mobile access point device.

* * * * *